United States Patent
Murata

(10) Patent No.: US 10,442,251 B2
(45) Date of Patent: Oct. 15, 2019

(54) PNEUMATIC TIRE WITH SIDE WALL DECORATIVE PORTION

(71) Applicant: The Yokohama Rubber Co., LTD., Minato-ku, Tokyo (JP)

(72) Inventor: Takahisa Murata, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 656 days.

(21) Appl. No.: 14/898,372

(22) PCT Filed: Apr. 24, 2014

(86) PCT No.: PCT/JP2014/061584
§ 371 (c)(1),
(2) Date: Dec. 14, 2015

(87) PCT Pub. No.: WO2014/199731
PCT Pub. Date: Dec. 18, 2014

(65) Prior Publication Data
US 2016/0137007 A1   May 19, 2016

(30) Foreign Application Priority Data
Jun. 14, 2013 (JP) .................................. 2013-125154

(51) Int. Cl.
*B60C 13/02* (2006.01)
*B60C 13/00* (2006.01)

(52) U.S. Cl.
CPC ............ *B60C 13/02* (2013.01); *B60C 13/001* (2013.01)

(58) Field of Classification Search
CPC ....... B60C 13/02; B60C 13/001; B60C 13/00; B60C 13/023; B60C 13/04; B60C 2013/045
(Continued)

(56) References Cited

U.S. PATENT DOCUMENTS 5,807,446 A * 9/1998 Ratliff, Jr. ............... B60C 13/02
152/523
6,253,815 B1 7/2001 Kemp et al.
(Continued)

FOREIGN PATENT DOCUMENTS

CN 1286661 3/2001
JP 61033303 A * 2/1986
(Continued)

OTHER PUBLICATIONS

English machine translation of JP 63-74703 A, Apr. 5, 1988.*
(Continued)

*Primary Examiner* — Adrienne C. Johnstone
(74) *Attorney, Agent, or Firm* — Thorpe North & Western

(57) ABSTRACT

A pneumatic tire includes a decorative portion on an outer surface of a side wall portion that includes a first region that is linked to the inner side in the tire radial direction and the outer side in the tire radial direction of the decorative portion without being divided by a circumferential direction rib band, and a second region that is continuously surrounded in at least three directions by a radial direction rib band and the circumferential direction rib band, the total area of the first region and the total area of the second region are each 10% or greater of the total area of the decorative portion, ridges are provided in at least one of the first region and the second region, and the pattern contrast between the first region and the second region is varied.

14 Claims, 4 Drawing Sheets

(58) Field of Classification Search
USPC .................. 152/523, 524; D12/605
See application file for complete search history.

(56) References Cited

U.S. PATENT DOCUMENTS

| | | | | |
|---|---|---|---|---|
| 6,439,287 | B1* | 8/2002 | Baumhofer | B60C 13/001 |
| | | | | 152/523 |
| 6,983,781 | B2* | 1/2006 | Ebiko | B60C 13/001 |
| | | | | 152/523 |
| D668,210 | S* | 10/2012 | Sato | D12/605 |
| D738,818 | S* | 9/2015 | Sato | D12/605 |
| 2002/0174928 | A1* | 11/2002 | Ratliff, Jr. | B60C 13/001 |
| 2008/0066846 | A1* | 3/2008 | Metz | B60C 13/001 |
| | | | | 152/523 |
| 2008/0087362 | A1* | 4/2008 | Metz | B60C 13/001 |
| | | | | 152/523 |
| 2009/0032161 | A1 | 2/2009 | Yamaguchi | |
| 2012/0273101 | A1 | 11/2012 | Iwabuchi | |
| 2012/0318423 | A1* | 12/2012 | Yamakawa | B60C 13/001 |
| | | | | 152/523 |
| 2013/0000808 | A1* | 1/2013 | Ishida | B60C 13/001 |
| | | | | 152/523 |
| 2015/0314652 | A1 | 11/2015 | Iwabuchi | |
| 2015/0314653 | A1 | 11/2015 | Iwabuchi | |

FOREIGN PATENT DOCUMENTS

| | | | |
|---|---|---|---|
| JP | 63074703 A | * | 4/1988 |
| JP | H01-0153306 | | 6/1989 |
| JP | 06106921 A | * | 4/1994 |
| JP | 08282216 A | * | 10/1996 |
| JP | 2001-206024 | | 7/2001 |
| JP | 2002-522294 | | 7/2002 |
| JP | 2004-224342 | | 8/2004 |
| JP | 2010-254088 | | 11/2010 |
| JP | 4640517 | | 3/2011 |
| JP | 2011-105231 | | 6/2011 |
| WO | WO 2000/09348 | | 2/2000 |
| WO | WO 2007/032405 | | 3/2007 |
| WO | WO 2011/062241 | | 5/2011 |
| WO | WO 2012/111773 | | 8/2012 |

OTHER PUBLICATIONS

English machine translation of JP 8-282216 A, Oct. 29, 1996.*
Mechanics of Pneumatic Tires, ed. Samuel Clark, US Department of Transportation, Aug. 1981, pp. 204-207.*
International Search Report for International Application No. PCT/JP2014/061584 dated Jul. 8, 2014, 4 pages, Japan.

* cited by examiner

PNEUMATIC TIRE WITH SIDE WALL DECORATIVE PORTION

TECHNICAL FIELD

The present technology relates to a pneumatic tire having a decorative portion on a side wall portion thereof, and more particularly relates to a pneumatic tire that can prevent damage during manufacture of a tire caused by providing a decoration, and, can improve a durability of the decoration while maintaining excellent camouflage properties.

BACKGROUND

Normally in a pneumatic tire, recesses and protrusions are produced on the outer surface of a side wall portion due to the structure of tire constituting members. For example, at a splice portion or folded up end portions of a carcass layer, a sheet material from which the carcass layer is configured is laminated at the end portions or at the folded up portion of the carcass layer main body portion so the thickness is substantially that of two layers, and as a result recesses and protrusions are produced on the outer surface of the side wall portion.

On the other hand, decorative portions are provided on the side wall portion so that these recesses and protrusions are inconspicuous (camouflaged). For example, Japanese Patent No. 4640517 proposes partitioning the decorative portion in a grid by a plurality of circumferential direction rib bands extending in the tire circumferential direction and a plurality of radial direction rib bands extending in the tire radial direction to form ridges in partitioned multiple rectangular regions. This decorative portion can camouflage the recesses and protrusions as described above by a pattern contrast of the series of rectangular regions (rectangular patterns) and presence/absence of the ridges.

However, upon forming the circumferential direction rib band and the radial direction rib band as described above, the flow of air when forming the tire is hindered by these ribs so there is a possibility of occurrence of vulcanization failures. Also, cracking can easily occur at multiple intersecting sections formed by an intersection of the circumferential direction rib band and the radial direction rib band, which intersections have a problem that the durability of the decoration itself becomes poor.

SUMMARY

The present technology provides a pneumatic tire that can prevent damage during manufacture of the tire caused by providing a decoration, and, can improve the durability of the decoration, while maintaining excellent camouflage properties.

A pneumatic tire according to the present technology includes a decorative portion on an outer surface of a side wall portion; and a plurality of radial direction rib bands extending in the tire radial direction and a plurality of circumferential direction rib bands extending in the tire circumferential direction formed on the decorative portion. The decorative portion includes a first region linked to the inner side in the tire radial direction and the outer side in the tire radial direction of the decorative portion without being divided by the circumferential direction rib band, and a second region that is continuously surrounded in at least three directions by the radial direction rib band and the circumferential direction rib band; the total area of the first region and the total area of the second region are each 10% or greater of the total area of the decorative portion; ridges are provided in at least one of the first region and the second region; and a pattern contrast between the first region and the second region is varied.

In the present technology, the first region is not divided in the tire circumferential direction by the circumferential direction rib band as described above, but is linked from the inner side in the tire radial direction to the outer side in the tire radial direction of the decorative portion, so it is possible to prevent local concentration of air, and prevent vulcanization failures. Also, the circumferential direction rib band is discontinuously disposed within the decorative portion so as not to divide the first region in the tire circumferential direction, so the number of intersecting positions at which the radial direction rib band and the circumferential direction rib band intersect is reduced, so it is possible to reduce the occurrence of cracking caused by these intersecting positions. In addition, as stated above, areas of the first region and the second region are each sufficiently large, and ridges are provided, so it is possible to maintain excellent camouflage properties. In particular, the second region is continuously surrounded by the radial direction rib band and the circumferential direction rib band, so the boundary between the first region and the second region is clear, and it is possible to effectively increase the camouflage properties.

In the present technology, preferably a linear section is included in a portion of the radial direction rib band, and preferably this linear section has an inclination angle with respect to the tire circumferential direction of at least 20°. By configuring the radial direction rib band in this way, it is possible to prevent an inclination of the radial direction rib band from being inclined too much and having a circumferential direction component that is too large, and thereby prevent cracking from easily occurring.

In the present technology, preferably at least a portion of an attaching portion of the radial direction rib band and the circumferential direction rib band is a smooth curved line. In this way, it is possible to relieve the angle of the attaching portion of the radial direction rib band and the circumferential direction rib band, and it is possible to effectively prevent the occurrence of cracking.

In the present technology, preferably ridges are provided in both the first region and the second region. In this way, the camouflage properties are increased, and in addition it is possible to increase a cracking resistance of each region. Also, when forming the tire, air can be evacuated along grooves in a mold for forming the ridges, which has the advantage of prevention of vulcanization failures.

In the present technology, preferably a ridge density of the region from among the first region and the second region with the larger total area has a relatively larger ridge density. In this way, it is possible to effectively evacuate air, which is advantageous in preventing vulcanization failures.

In the present technology, preferably the ridge density is in the range of 4 ridge/cm to 40 ridge/cm. In this way the camouflage properties and the cracking resistance is improved, and it is possible to effectively prevent vulcanization failures.

In the present technology, preferably the ridge density of the region from among the first region and the second region with the larger relative ridge density is 1.3 times or greater than the ridge density of the region with the smaller relative ridge density. In this way, the pattern contrast between the first region and the second region becomes excellent, and it is possible to improve the camouflage properties.

In the present technology, preferably the ridge density of the region from among the first region and the second region with the larger total area has a relatively larger ridge density by providing intersecting ridges. By adopting the intersecting ridges in the region that is relatively broad in this way, it is possible to prevent cracking, and also to improve the air elimination performance. Also, the pattern contrast is made clearer by the reflection of light by the intersecting ridges, so it is possible to improve the camouflage properties.

In the present technology, preferably the width of the radial direction rib band and the circumferential direction rib band is in the range of 0.2 mm to 3.0 mm each. In this way, it is possible to make clear the boundary between the first region and the second region, and improve the camouflage properties.

DETAILED DESCRIPTION

The following is a detailed description of the configuration of the present technology with reference to the accompanying drawings.

Figure 1:
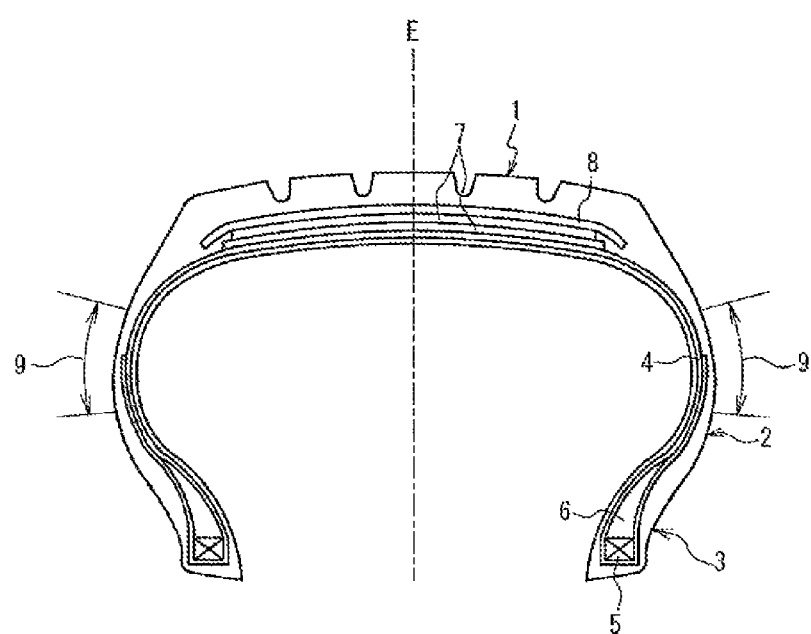
FIG. 1 is a meridian cross-sectional view of a pneumatic tire according to an embodiment of the present technology.

In FIG. 1, 1 is a tread portion, 2 is a side wall portion, 3 is a bead portion, and E is a tire equatorial plane. A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a tire inner side to a tire outer side. Additionally, a bead filler 6 is disposed on the periphery of the bead core 5, and the bead filler 6 is enveloped by a main body part and a folded back part of the carcass layer 4. On the other hand, in the tread portion 1, a plurality of belt layers 7 (two layers in FIG. 1) is embedded on the outer peripheral side of the carcass layer 4. Each belt layer 7 includes a plurality of reinforcing cords that are inclined with respect to the tire circumferential direction, and the reinforcing cords are disposed between the layers so as to intersect each other. In the belt layers 7, the inclination angle of the reinforcing cords with respect to the tire circumferential direction is set in the range, for example, of 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology is applied to such a general pneumatic tire, however, the cross-sectional structure thereof is not limited to the basic structure described above.

Figure 2:
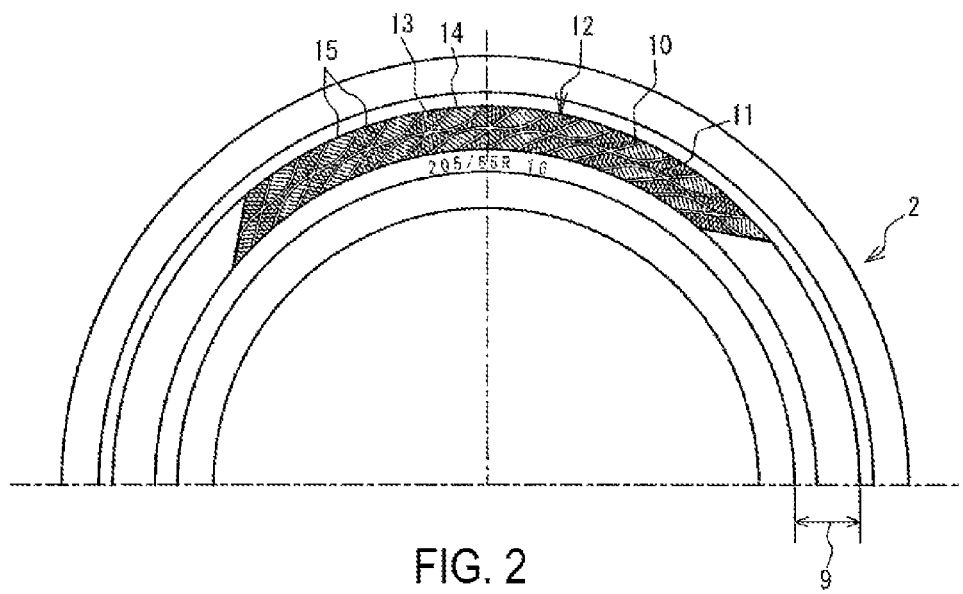
FIG. 2 is a side view of the pneumatic tire according to an embodiment of the present technology.

As illustrated in FIG. 2, there is a decorative region 9 that extends over the whole circumference in the tire circumferential direction in the center portion in the tire radial direction on the outer surface of the side wall portion 2 of the present technology. Alphanumeric strings indicating tire information or the like or decorations for improving the appearance of the tire are provided on the decorative region 9. Also, a decorative portion 12 that includes a plurality of radial direction rib bands 10 that extend in the tire radial direction and a plurality of circumferential direction rib bands 11 that extend in the tire circumferential direction is formed on a portion of the decorative region 9. As can be seen in FIG. 2, the radial direction rib bands 10 are not limited to the radial direction and can be transverse direction rib bands extending in a direction crossing the tire circumferential direction.

Figure 3:
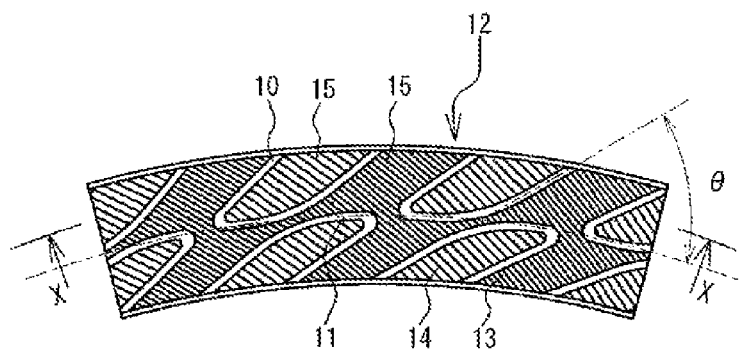
FIG. 3 is a front view illustrating an enlargement of a portion of a decorative portion of the pneumatic tire according to an embodiment of the present technology.

As illustrated in FIG. 3, the decorative portion 12 includes a first region 13 in which the inner side in the tire radial direction and the outer side in the tire radial direction of the decorative portion 12 are not divided by the circumferential direction rib band 11 but are linked, and a second region 14 that is continuously surrounded in at least three directions by the radial direction rib band 10 and the circumferential direction rib band 11. In particular, in the embodiment illustrated in FIG. 3, the second region 14 is continuously surrounded in three directions by two radial direction rib bands 10 and a circumferential direction rib band 11, and is linked to one of either the inner side in the tire radial direction or the outer side in the tire radial direction of the decorative portion 12. On the other hand, the first region 13 of the embodiment illustrated in FIG. 3 is a portion of the decorative portion 12 other than the second region 14, and is linked not only with the inner side in the tire radial direction and the outer side in the tire radial direction of the decorative portion 12, but also the first regions 13 are linked to each other.

Viewed in another way, in the embodiment of FIG. 3, the plurality of radial direction rib bands 10 are disposed at intervals in the tire circumferential direction, and, each radial direction rib band 10 has a terminating edge near the center in the tire radial direction of the decorative portion 12. On the other hand, the circumferential direction rib band 11 is disposed intermittently so as to connect the terminating portions of two adjacent radial direction rib bands 10.

The total area of the first regions 13 and the second regions 14 formed in this way is 10% or greater of the total area of the decorative portion 12 for each. Also, ridges 15 (band-like ridges) are provided in at least one of the first regions 13 and the second regions 14 (both in FIG. 3). In the embodiment of FIG. 3, by narrowing the ridge spacing of the ridges 15 of the first region 13, a pattern contrast of the first region 13 and the second region 14 is varied.

Figure 4:
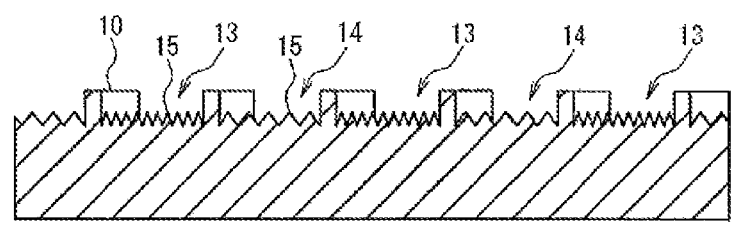
FIG. 4 is a cross-sectional view of the decorative portion taken along the line X-X in FIG. 3.

In the present technology, the ridges 15 (band-like ridges) are a group of protrusions formed from a plurality of linear protrusions arranged substantially parallel at small intervals on the outer surface of the side wall portion 2. In the parts where the ridges 15 are provided, the cross-sectional shape has a sawtooth appearance as illustrated in FIG. 4. In the example in FIG. 4, the ridge spacing of the ridges 15 of the first region 13 is narrower than the ridge spacing of the ridges 15 of the second region 14, and in this way a pattern contrast is varied.

By configuring the decorative portion 12 in this way, during vulcanization, it is possible to evacuate air through the second region 13 which is linked from the inner side in the tire radial direction to the outer side in the outer side in the tire radial direction of the decorative portion 12, and prevent vulcanization failures. Also, compared with the conventional case in which rectangular regions are arranged in a grid, the number of the intersecting positions of the radial direction rib band 10 and the circumferential direction rib band 11 is reduced, so it is possible to reduce cracking which initiates at these intersecting positions. That is, it is possible to improve the durability of the decorations themselves. In addition, as stated above, the areas of the first region 13 and the second region 14 are each sufficiently large, and the ridges 15 are provided, so it is possible to maintain excellent camouflage properties. In particular, the second regions 14 are continuously surrounded by the radial direction rib band 10 and the circumferential direction rib band 11, so the boundary between the first region 13 and the second region 14 is clear, and it is possible to effectively increase the camouflage properties.

At this time, upon the total area of the first region 13 or the second region 14 being less than 10% of the total area of the decorative portion 12, the first region 13 or the second region 14 becomes too small, and the decorative portion 12 does not change from a configuration formed from substantially a single region only, and it is not possible to improve the camouflage properties. Preferably the total area of the first regions 13 and the second regions 14 is each 30% or greater of the total area of the decorative portion 12, and more preferably 40% or greater. By making each region sufficiently large in this way, it is possible to improve the camouflage properties.

In the present technology, as illustrated in FIG. 3, a linear section is included in a portion of the radial direction rib band 10, and preferably this linear section has an inclination angle θ with respect to the tire circumferential direction of 20° or greater. By configuring the radial direction rib band 10 in this way, it is possible to prevent cracking from easily occurring due to the radial direction rib band 10 being extremely inclined and having a circumferential direction component that is too large. Upon this inclination angle θ being less than 20°, the circumferential direction component of the radial direction rib band 10 becomes too large, and it is not possible to obtain a sufficient effect of reduction in an occurrence of cracking.

The circumferential direction rib band 11 also may include a linear section in a portion thereof. In this case, the linear section of the circumferential direction rib band 11 may be inclined within the range of ±20° with respect to the tire circumferential direction.

The radial direction rib band 10 and the circumferential direction rib band 11 may be attached in a straight line, but preferably an attaching portion of the radial direction rib band 10 and the circumferential direction rib band 11 is a smoothly curved line. In this way, it is possible to relieve the angle of the attaching portion of the radial direction rib band 10 and the circumferential direction rib band 11, and it is possible to effectively prevent the occurrence of cracking.

Preferably a width of the radial direction rib band 10 and the circumferential direction rib band 11 is in the range of 0.2 mm to 3.0 mm each. More preferably the width of the radial direction rib band 10 and the circumferential direction rib band 11 is in the range of 0.5 mm to 1.5 mm each. In this way, it is possible to make the boundary between the first region 13 and the second region 14 clear, and improve the camouflage properties. Upon the width of each of the rib bands 10, 11 being less than 0.2 mm, it becomes difficult to make the boundary between the first region 13 and the second region 14 clear. Upon the width of each of the rib bands 10, 11 being greater than 3.0 mm, cracking can easily occur at each of the rib bands 10, 11.

Figure 5:
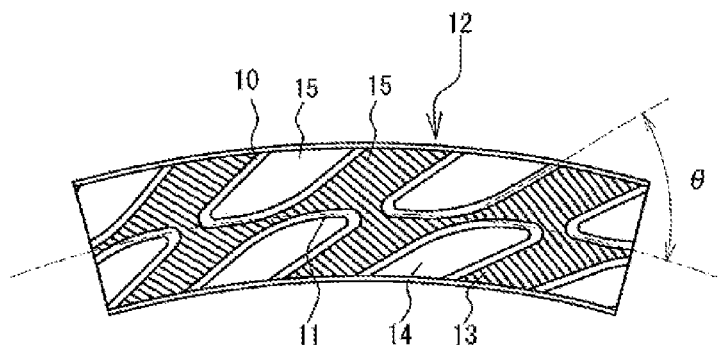
FIG. 5 is a front view illustrating an enlargement of a portion of a decorative portion of a pneumatic tire according to another embodiment of the present technology.

In the present technology, as illustrated in the embodiment in FIG. 3, preferably the ridges 15 are provided in both the first region 13 and the second region 14, but as illustrated in FIG. 5 the ridges 15 may be not provided in the second region 14 and the ridges 15 may be only provided in the first region 13, thereby varying the pattern contrast in accordance with the presence/absence of the ridges 15.

Regardless of whether the ridges 15 are provided in one of the first region 13 or the second region 14, or, the ridges 15 are provided in both the regions, preferably the ridge density is relatively greater in the region with the greater total area from among the first region 13 and the second region 14. That is, preferably either the ridges are provided in both the first region 13 and the second region 14, and the ridge density is relatively greater in the region of these regions with the greater total area, or ridges are only provided in the region from among the first region 13 and the second region 14 with the greater total area, and ridges are not provided in the region with the smaller total area (that is, the ridge density is zero). In this way, it is possible to effectively evacuate air, which is advantageous in preventing vulcanization failures. In cases where the total areas of the first region 13 and the second region 14 are equal, preferably the ridge density is larger in the first region 13, which is continuous from the inner side in the tire radial direction to the outer side in the tire radial direction of the decorative portion 12.

Figure 6:
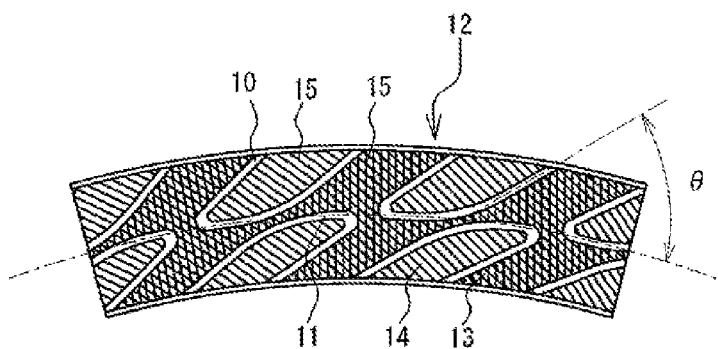
FIG. 6 is a front view illustrating an enlargement of a portion of a decorative portion of a pneumatic tire according to yet another embodiment of the present technology.

The ridge density can be changed by the presence/absence of the ridges, or by varying the ridge spacing, as described above, but preferably as illustrated in FIG. 6, in the region from among the first region 13 and the second region 14 with the greater total area (the first region 13 in FIG. 6), intersecting ridges are provided in order to increase the relative ridge density in that region. By providing the intersecting ridges in the region that is relatively broad in this way, it is possible to prevent cracking, and also to improve the air elimination performance. Also, the pattern contrast is made clearer by the reflection of the light by intersecting ridges 15, so it is possible to improve the camouflage properties.

Intersecting ridges use two types of groups of protrusions as described above for the ridges 15 (band-like ridges), and the directions of extension of the two types of groups of protrusions are different, so that they intersect each other.

Upon providing the ridges 15, preferably the ridge density is from 4 ridge/cm to 40 ridge/cm. In this way the camouflage properties and the cracking resistance is improved, and it is possible to effectively prevent vulcanization failures. Upon the ridge density being less than 4 ridge/cm, it is not possible to obtain the effect of sufficiently improving the camouflage properties or the cracking resistance. Upon the ridge density being greater than 40 ridge/cm, the ridges 15 will be too narrow, so processing the mold will be difficult, and the manufacturing cost will increase.

Note that a ridge density of 4 ridge/cm has a ridge spacing of about 2.5 mm with band-like ridges, and about 2.5 mm with intersecting ridges, and a ridge density of 40 ridge/cm has a ridge spacing of about 0.25 mm with band-like ridges, and about 0.25 mm with intersecting ridges.

In the present technology, preferably the ridge density of the region from among the first region 13 and the second region 14 with the larger relative ridge density is 1.3 times or greater than the ridge density of the region with the smaller relative ridge density. More preferably it is in the range of 1.5 to 3.0. In this way the pattern contrast between the first region 13 and the second region 14 becomes clear, and it is possible to effectively increase the camouflage properties. Upon the ridge density of the region with the larger ridge density being less than 1.3 times the ridge density of the region with the smaller ridge density, the pattern contrast between the first region and the second region will be insufficient, and it will not be possible to obtain the effect of sufficiently increasing the camouflage properties.

Figure 7:
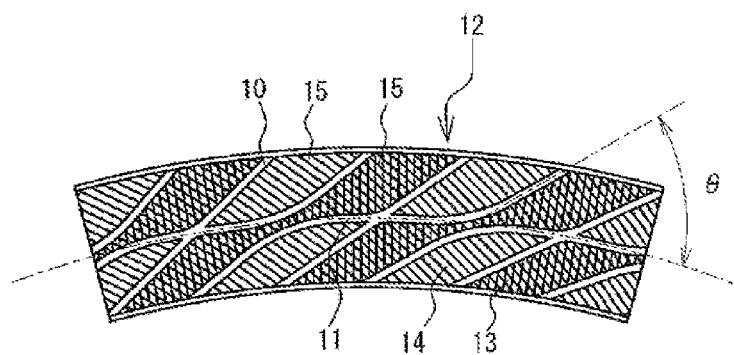
FIG. 7 is a front view illustrating an enlargement of a portion of a decorative portion of a pneumatic tire according to yet another embodiment of the present technology.

In the present technology, upon the first region 13 being not divided in the tire circumferential direction, it may be divided in the tire radial direction as illustrated in FIG. 7. That is, the radial direction rib band 10 can extend from the inner side in the tire radial direction to the outer side in the tire radial direction of the decorative portion 12.

In this case, the first region 13 does not have a connected shape in which parts are attached together throughout the whole decorative portion 12 as in the embodiment in FIG. 3, but is divided in two directions (both sides in the tire circumferential direction) by the radial direction rib band 10 and the circumferential direction rib band 11. However, it is attached in the inner side in the tire radial direction and the outer side in the tire radial direction of the decorative portion 12, and is not divided in the tire circumferential direction. Therefore, it is possible to improve the air elimination properties. Furthermore, the first region 13 is clearly partitioned by the radial direction rib band 10 and the circumferential direction rib band 11, so the pattern that is configured from the first region 13 and the second region 14 is made clear, which has the advantage of improving the camouflage properties. In the present embodiment, the radial direction rib band 10 and the circumferential direction rib band 11 intersect in part, but compared with the pattern of arrangement of the conventional grid pattern into rectangular regions, the number of intersecting positions is reduced, so it is possible to ensure sufficient durability of the pattern.

Figure 8:
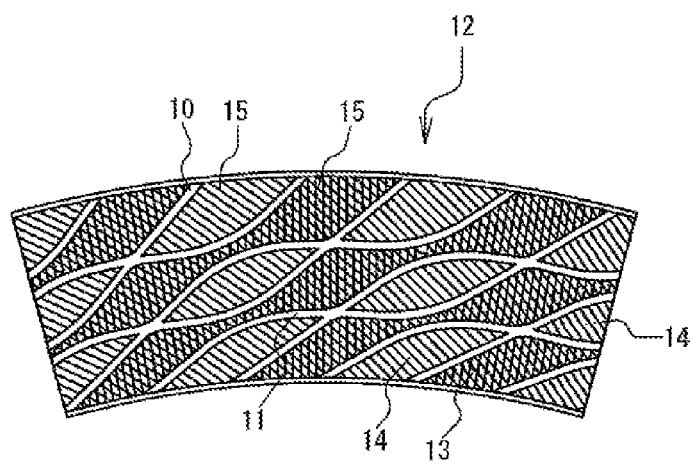
FIG. 8 is a front view illustrating an enlargement of a portion of a decorative portion of a pneumatic tire according to yet another embodiment of the present technology.

Also, the second region 14 may have a form that is surrounded on four directions by the radial direction rib band 10 and the circumferential direction rib band 11. For example, in the embodiment of FIG. 8, three second regions 14 are arranged in the tire radial direction of the decorative portion 12, and of these the second regions 14 located in the center portion in the tire radial direction of the decorative portion 12 are surrounded on four directions by the radial direction rib band 10 and the circumferential direction rib band 11. On the other hand, the second regions 14 on the inner side and the outer side in the tire radial direction are surrounded in three directions by the radial direction rib band 10 and the circumferential direction rib band 11, and each are linked to either the inner side in the tire radial direction or the outer side in the tire radial direction. In a structure such as this also, the first region 13 is linked to the inner side and the outer side in the tire radial direction of the decorative portion 12, so it is possible to improve the air elimination properties. Also, in this case, the number of second regions 14 is increased, and the pattern becomes more complex, so it is also possible to increase the camouflage properties.

EXAMPLE

Twelve types of pneumatic tire, Conventional Example 1, Comparative Examples from 1 to 3, and Working Examples from 1 to 8, were produced with the tire size 205/55R16, having the cross-sectional shape illustrated in FIG. 1, and with the structure of the decorative portion provided on the side wall portions, that is, the angle of the linear section of the radial direction and circumferential direction rib band, the shape of the circumferential direction rib band, the width of the radial direction and circumferential direction rib band, the shape of the attaching portion, the shape of the first region and the second region, the percentage of the total area, the ridge density, the ratio of the ridge density of the first region and the second region, set as illustrated in Table 1.

The percentage of the total area for each region is the percentage of the total area of each region with respect to the area of the whole decorative portion. Also, the ratio of the ridge densities is the ratio of the density for the region with the relatively larger ridge density relative to the density for the region with the relatively smaller ridge density.

The camouflage properties, the air elimination properties, and the cracking resistance were evaluated for each of the 12 types of pneumatic tire in accordance with the evaluation methods described below, and the results are also shown in Table 1.

Camouflage Properties

For each of the test tires, the extent of recesses and protrusions on the side wall portions caused by the structure of the tire constituting members (carcass splice portions and carcass folded up edge portions) was evaluated visually. Evaluation results were expressed as index values, Conventional Example 1 being assigned an index value of 100. A larger value means the recesses and protrusions of the side wall portion are not prominent, and the camouflage properties are excellent.

Air Elimination Properties

For each test tire, the number of faults (light faults) caused by air stagnation occurring in the side wall portion was measured visually. The evaluation results were expressed as an index using the inverse of the measurement value, with Conventional Example 1 being assigned an index value of 100. The larger the index value, the smaller the occurrence of light faults, and the better the air elimination properties.

Cracking Resistance

Each test tire was fitted to a wheel of rim size 16×16.5, inflated to an air pressure of 100 kPa, installed on a drum type 1707 mm indoor drum testing machine, driven for 50 hours at a speed of 80 km/h under a load of 4.5 kN, while exposing to ozone at the concentration of 100 pphm at a position 10 mm from the surface of the side wall portion of the test tire, and after driving the number of cracking that had occurred was measured. The evaluation results were expressed as an index using the inverse of the measurement value, with Conventional Example 1 being assigned an index value of 100. The larger the value of the index, the lower the number of occurrences of cracking, and the better the cracking resistance.

TABLE 1

| | | | | Conventional Example 1 | Comparative Example 1 |
|---|---|---|---|---|---|
| Rib band | Angle of linear section | Radial direction | ° | 45 | 10 |
| | | Circumferential direction | ° | 0 | 0 |
| | Shape of circumferential direction rib band | | | Continuous | Discontinuous |
| | Width | | mm | 0.1 | 0.1 |
| | Shape of attaching portion | | | Straight line | Straight line |
| First region | Form | | | Absent | Band-like |
| | Percentage of total area | | % | 50 | 60 |
| | Ridge density | | ridge/cm | — | 3.5 |
| Second region | Form | | | Band-like | Absent |
| | Percentage of total area | | % | 50 | 40 |
| | Ridge density | | ridge/cm | 14 | — |
| Ratio of ridge densities | | | | — | — |
| Camouflage properties | | | Index value | 100 | 100 |
| Air elimination properties | | | Index value | 100 | 105 |
| Cracking resistance | | | Index value | 100 | 90 |

| | | | | Comparative Example 2 | Comparative Example 3 |
|---|---|---|---|---|---|
| Rib band | Angle of linear section | Radial direction | ° | 45 | 45 |
| | | Circumferential direction | ° | 0 | 0 |
| | Shape of circumferential direction rib band | | | Discontinuous | Discontinuous |
| | Width | | mm | 0.1 | 0.1 |
| | Shape of attaching portion | | | Straight line | Straight line |
| First region | Form | | | Band-like | Band-like |
| | Percentage of total area | | % | 60 | 95 |
| | Ridge density | | ridge/cm | 4 | 3.5 |
| Second region | Form | | | Band-like | Absent |
| | Percentage of total area | | % | 40 | 5 |
| | Ridge density | | ridge/cm | 4 | — |
| Ratio of ridge densities | | | | 1 | — |
| Camouflage properties | | | Index value | 96 | 90 |
| Air elimination properties | | | Index value | 108 | 106 |
| Cracking resistance | | | Index value | 108 | 106 |

| | | | | Working Example 1 | Working Example 2 |
|---|---|---|---|---|---|
| Rib band | Angle of linear section | Radial direction | ° | 45 | 45 |
| | | Circumferential direction | ° | 0 | 0 |
| | Shape of circumferential direction rib band | | | Discontinuous | Discontinuous |
| | Width | | mm | 0.1 | 0.1 |
| | Shape of attaching portion | | | Straight line | Curved |
| First region | Form | | | Band-like | Band-like |
| | Percentage of total area | | % | 60 | 60 |
| | Ridge density | | ridge/cm | 3.5 | 3.5 |

TABLE 1-continued

|  |  |  |  | | |
|---|---|---|---|---|---|
| Second region | Form | | | Absent | Absent |
|  | Percentage of total area | % | | 40 | 40 |
|  | Ridge density | ridge/cm | | — | — |
| Ratio of ridge densities | | | | — | — |
| Camouflage properties | | Index value | | 100 | 100 |
| Air elimination properties | | Index value | | 104 | 104 |
| Cracking resistance | | Index value | | 104 | 108 |

|  |  |  |  | Working Example 3 | Working Example 4 |
|---|---|---|---|---|---|
| Rib band | Angle of linear section | Radial direction | ° | 45 | 45 |
|  |  | Circumferential direction | ° | 0 | 0 |
|  | Shape of circumferential direction rib band | | | Discontinuous | Discontinuous |
|  | Width | | mm | 0.1 | 0.1 |
|  | Shape of attaching portion | | | Curved | Curved |
| First region | Form | | | Band-like | Band-like |
|  | Percentage of total area | | % | 60 | 40 |
|  | Ridge density | | ridge/cm | 3.5 | 3.5 |
| Second region | Form | | | Band-like | Band-like |
|  | Percentage of total area | | % | 40 | 60 |
|  | Ridge density | | ridge/cm | 4 | 4 |
| Ratio of ridge densities | | | | 1.1 | 1.1 |
| Camouflage properties | | Index value | | 104 | 104 |
| Air elimination properties | | Index value | | 108 | 110 |
| Cracking resistance | | Index value | | 113 | 115 |

|  |  |  |  | Working Example 5 | Working Example 6 |
|---|---|---|---|---|---|
| Rib band | Angle of linear section | Radial direction | ° | 45 | 45 |
|  |  | Circumferential direction | ° | 0 | 0 |
|  | Shape of circumferential direction rib band | | | Discontinuous | Discontinuous |
|  | Width | | mm | 0.1 | 0.1 |
|  | Shape of attaching portion | | | Curved | Curved |
| First region | Form | | | Band-like | Band-like |
|  | Percentage of total area | | % | 40 | 40 |
|  | Ridge density | | ridge/cm | 12 | 10 |
| Second region | Form | | | Band-like | Band-like |
|  | Percentage of total area | | % | 60 | 60 |
|  | Ridge density | | ridge/cm | 14 | 20 |
| Ratio of ridge densities | | | | 1.2 | 2 |
| Camouflage properties | | Index value | | 104 | 107 |
| Air elimination properties | | Index value | | 113 | 113 |
| Cracking resistance | | Index value | | 118 | 118 |

TABLE 1-continued

|  |  |  |  | Working Example 7 | Working Example 8 |
|---|---|---|---|---|---|
| Rib band | Angle of linear section | Radial direction | ° | 45 | 45 |
|  |  | Circumferential direction | ° | 0 | 0 |
|  | Shape of circumferential direction rib band |  |  | Discontinuous | Discontinuous |
|  | Width |  | mm | 0.1 | 1 |
|  | Shape of attaching portion |  |  | Curved | Curved |
| First region | Form |  |  | Band-like | Band-like |
|  | Percentage of total area |  | % | 40 | 40 |
|  | Ridge density |  | ridge/cm | 10 | 10 |
| Second region | Form |  |  | Intersecting | Intersecting |
|  | Percentage of total area |  | % | 60 | 60 |
|  | Ridge density |  | ridge/cm | 20 | 20 |
| Ratio of ridge densities |  |  |  | 2 | 2 |
| Camouflage properties |  |  | Index value | 109 | 112 |
| Air elimination properties |  |  | Index value | 117 | 117 |
| Cracking resistance |  |  | Index value | 120 | 120 |

As can be seen from Table 1, each one of Working Examples 1 to 8 have improved air elimination properties and cracking resistance, while maintaining a high level of camouflage properties.

On the other hand, the cracking resistance was poor for Comparative Example 1 in which the inclination angle of the radial direction rib band was too small, and the camouflage properties was poor for Comparative Example 2 in which there was no variation in the ridge density between the first region and the second region, and the camouflage properties was poor for Comparative Example 3 in which the total area of the second region was too small.

The invention claimed is:

1. A pneumatic tire comprising:
a decorative portion on an outer surface of a side wall portion; and
formed on the decorative portion, a plurality of transverse direction rib bands extending in a direction crossing a tire circumferential direction and a plurality of circumferential direction rib bands extending in the tire circumferential direction or extending linearly in a direction inclined to the tire circumferential direction within a range of ±20° exclusive; wherein
the decorative portion includes a first region linked to both an inner side in a tire radial direction and an outer side in the tire radial direction of the decorative portion without being divided by any circumferential direction rib band, and second regions that are continuously surrounded in at least three directions by the plurality of transverse direction rib bands and the plurality of circumferential direction rib bands;
the transverse direction rib bands include first transverse direction rib bands and second transverse direction rib bands;
the first transverse direction rib bands are disposed at intervals in the tire circumferential direction and extend crossing the tire circumferential direction, wherein one edge of each first transverse direction rib band is linked with the inner side in the tire radial direction of the decorative portion and the other edge of each first transverse direction rib band terminates at a center in the tire radial direction of the decorative portion;
the second transverse direction rib bands are disposed at intervals in the tire circumferential direction and extend crossing the tire circumferential direction, wherein one edge of each second transverse direction rib band is linked with the outer side in the tire radial direction of the decorative portion and the other edge of each second transverse direction rib band terminates at the center in the tire radial direction of the decorative portion;
each of the transverse direction rib bands including the first transverse direction rib bands and second transverse direction rib bands include a linear section having an inclination angle with respect to the tire circumferential direction of 20° or greater;
the second regions consist of a plurality of inner second regions and a plurality of outer second regions;
each inner second region is formed by being surrounded by two of the first transverse direction rib bands disposed at intervals in the tire circumferential direction and one of the circumferential direction rib bands disposed intermittently so as to connect the terminating portions of the two adjacent first transverse direction rib bands;
each outer second region is formed by being surrounded by two of the second transverse direction rib bands disposed at intervals in the tire circumferential direction and one of the circumferential direction rib bands disposed intermittently so as to connect the terminating portions of the two adjacent second transverse direction rib bands;
a total area of the first region and a total area of the second regions are each 30% or greater of a total area of the decorative portion;
ridges are provided in at least one of the first region and the second regions;

the plurality of inner second regions and the plurality of outer second regions are disposed in an alternating arrangement in the circumferential direction such that each inner second region is followed by an outer second region and each outer second region is followed by an inner second region, each second region being separated from the other second regions by the first region; and a pattern contrast exists between the first region and the second regions.

2. The pneumatic tire according to claim 1, wherein an attaching portion attaching one of the transverse direction rib bands and the at least one of the circumferential direction rib bands is a smooth curved line.

3. The pneumatic tire according to claim 2, wherein the ridges are provided in both the first region and the second regions.

4. The pneumatic tire according to claim 3, wherein the larger total area from among the total area of the first region and the total area of the second regions has a relatively larger ridge density.

5. The pneumatic tire according to claim 4, wherein the ridge density in the first region and the second regions is from 4 ridges/cm to 40 ridges/cm.

6. The pneumatic tire according to claim 5, wherein the relatively larger ridge density is at least 1.3 times the relatively smaller ridge density.

7. The pneumatic tire according to claim 6, wherein the relatively larger ridge density is relatively increased by providing intersecting ridges.

8. The pneumatic tire according to claim 7, wherein a width of each transverse direction rib band and each circumferential direction rib band is within the range of 0.2 mm to 3.0 mm.

9. The pneumatic tire according to claim 1, wherein the ridges are provided in both the first region and the second regions.

10. The pneumatic tire according to claim 1, wherein the larger total area from among the total area of the first region and the total area of the second regions has a relatively larger ridge density.

11. The pneumatic tire according to claim 10, wherein the relatively larger ridge density is at least 1.3 times the relatively smaller ridge density.

12. The pneumatic tire according to claim 10, wherein the relatively larger ridge density is relatively increased by providing intersecting ridges.

13. The pneumatic tire according to claim 1, wherein the ridge density is from 4 ridges/cm to 40 ridges/cm.

14. The pneumatic tire according to claim 1, wherein a width of each transverse rib band and each circumferential direction rib band is within the range of 0.2 mm to 3.0 mm.

* * * * *